(12) United States Patent
Tisol Jr. et al.

(10) Patent No.: US 6,735,824 B2
(45) Date of Patent: May 18, 2004

(54) ACCESSORY MOUNTING MECHANISM

(75) Inventors: James S. Tisol Jr., Chippewa Falls, WI (US); David W. Edland, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 48 days.

(21) Appl. No.: 10/300,686

(22) Filed: Nov. 20, 2002

(65) Prior Publication Data

US 2003/0097728 A1 May 29, 2003

Related U.S. Application Data

(60) Provisional application No. 60/331,962, filed on Nov. 21, 2001.

(51) Int. Cl.⁷ .......................... B62B 7/00; A45C 13/26
(52) U.S. Cl. ............... 16/412; 16/444; 16/446
(58) Field of Search .................. 16/114.1, 444, 16/446, 412, DIG. 40, DIG. 41, 410; 296/214; 411/511

(56) References Cited

U.S. PATENT DOCUMENTS 5,285,551 A * 2/1994 Weiland et al. ............... 16/442
5,440,783 A * 8/1995 Allardyce et al. ........... 16/110.1
5,797,164 A * 8/1998 Donaghy ....................... 16/412
5,931,525 A * 8/1999 Rickabus ....................... 296/214
6,517,302 B2 * 2/2003 Lee ............................. 411/182
6,553,629 B2 * 4/2003 Grady et al. ................... 16/444
6,647,594 B1 * 11/2003 Deb et al. ....................... 16/410
6,668,424 B1 * 12/2003 Allen et al. ..................... 16/444

* cited by examiner

Primary Examiner—Gary S. Hartmann
(74) Attorney, Agent, or Firm—Mark W. Croll; Paul F. Donovan

(57) ABSTRACT

A accessory mounting mechanism for securing an accessory to the frame of a vehicle as herein disclosed. The accessory mounting mechanism generally comprises an upper grommet into which is inserted an end of the accessory, a lower grommet to which the upper grommet is secured, and a cap which covers both the upper and lower grommets. The lower grommet is provided with a retaining structure that engages a bore formed through the frame of the vehicle, so as to secure the accessory mounting mechanism thereto. The structure of the accessory mounting mechanism enables a simplified methodology for installing an accessory within a vehicle that involves the steps of pre-assembling the accessory mounting mechanism and then addressing the retaining structure of the accessory mounting mechanism to a bore formed through the frame of the vehicle so as to secure the accessory thereto.

10 Claims, 2 Drawing Sheets

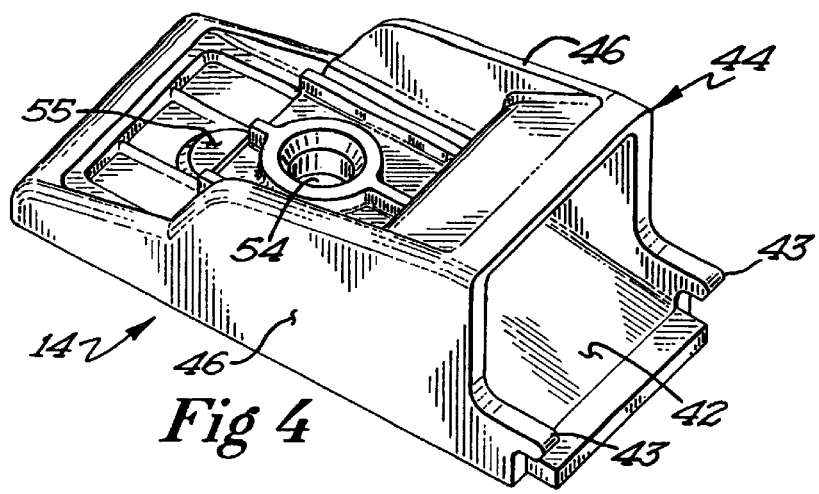
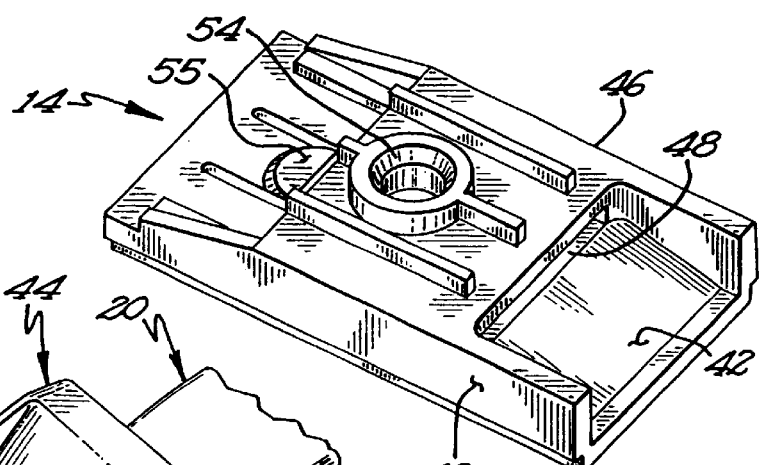
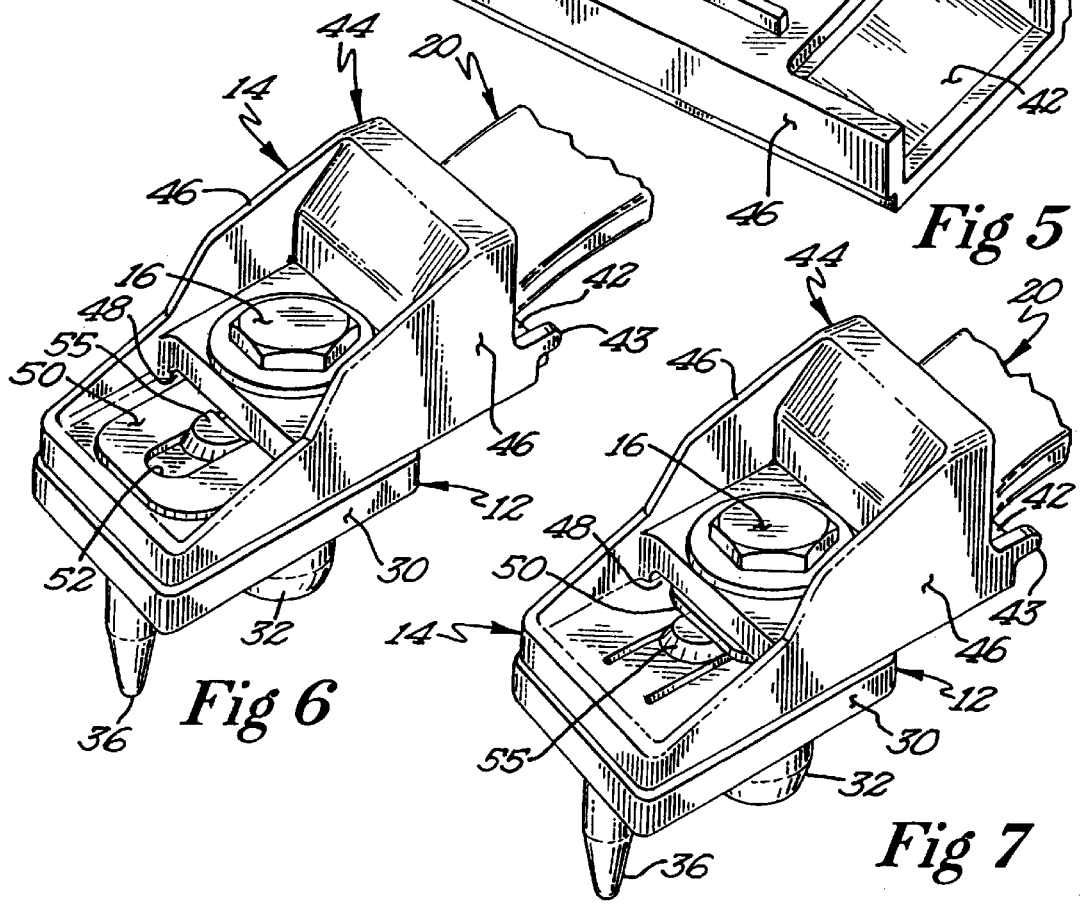

ACCESSORY MOUNTING MECHANISM

CROSS REFERENCE TO RELATED APPLICATIONS

This application is related to and claims the benefit of U.S. Provisional Patent Application Serial No. 60/331,962 filed on Nov. 21, 2001.

FIELD OF THE INVENTION

The present invention relates generally to a fastener used to secure a vehicle component to the frame of the vehicle.

BACKGROUND OF THE INVENTION

In the manufacture of vehicles such as automobiles, it is a common practice to pre-assemble certain portions of the vehicle remotely from the main assembly line. These pre-assembled portions are then brought to the main assembly line and assembled with the remainder of the vehicle in a process that is generally faster than assembling each component part at the main assembly line. This process is used for both large assemblies, such as motors and the like, and for smaller components and accessories such as grab handles, door handles, or hang hooks.

A typical means of securing an accessory to the interior of an automobile is to utilize a common, threaded fastener, which passes through the accessory and into the frame or substrate of the vehicle. Unfortunately, the structures that enable the use of threaded fasteners tend to be rather complicated, requiring numerous parts and steps in their assembly. Accordingly, there is a need for a simplified structure for attaching vehicle accessories to the substrate of the vehicle.

SUMMARY OF THE INVENTION

The shortcomings of the prior art are satisfied by a grommet assembly that is adapted for securing an accessory to the substrate, i.e. frame, of a vehicle. The grommet assembly comprises a lower grommet having a retaining structure adapted for securing the grommet assembly to the substrate of the vehicle, and an upper grommet having a slot that is constructed and arranged to receive and retain an end of the accessory therein. The upper and lower grommets have bores that are substantially aligned when the upper and lower grommets are registered with one another. A fastener passed through the bore in the upper grommet simultaneously passes through a hole or bore formed in the end of the accessory and into the bore formed in the lower grommet. Once this fastener is driven home, the upper and lower grommets are secured to one another, and the end of the accessory will be retained in the grommet assembly. A cap for covering all or a portion of the upper and lower grommets may be secured to the upper grommet, though the cap may also be adapted to be coupled to the lower grommet. Depending on the application, the cap of the grommet assembly may need to be assembled with the accessory before the end of the accessory is inserted into the upper grommet. Once the upper and lower grommets and cap have been assembled with one another so as to securely retain the end of the accessory therein, the grommet assembly is referred to as a part-in-assembly (PIA). This part-in-assembly may then be transported to an assembly line for assembly with a vehicle.

The retaining structure of the lower grommet secures the grommet assembly to the substrate of a vehicle. To that end, the shaft of the retaining structure typically has a snap fit mechanism or the like formed thereon. Suitable snap fit mechanisms may include flexible tabs, detents, a plurality of frustoconical vanes, and laterally extending wings. Where suitable, a friction or interference fit between the retaining structure and the bore formed through the substrate of the vehicle may suffice. Note that in a preferred embodiment of the present invention, the bore formed into the lower grommet will also extend into the shaft of the retaining structure.

Where rotation of the grommet assembly would be detrimental, a lower grommet may be provided with an additional structure that is referred to as an anti-rotation stem. This stem is a simple projection that extends downwardly from the undersurface of the lower grommet similar to the retaining structure. The stem is inserted into a bore simultaneous with the insertion of the retaining structure into a respective bore formed through the substrate of the vehicle.

The structure of the present invention enables a relatively simple method for installing an accessory in the substrate of a vehicle. The method of installing an accessory in a vehicle begins with the step of inserting an end of an accessory into a slot that is formed in the upper grommet, taking care to insure that a bore formed through the end of the accessory is in registration with a bore that passes through the upper grommet so as to intersect the slot of the upper grommet. Once this is complete, the lower surface of the upper grommet is registered with an upper surface of the lower grommet such that a bore that is formed in the lower grommet is in substantial alignment with the bore formed through the upper grommet. Note that the lower grommet has extending downwardly from an undersurface thereof a retaining structure that is preferably also aligned with the bore formed through the lower grommet. In a preferred embodiment, the bore formed into the lower grommet extends at least partially into this retaining structure.

A fastener is next driven through the bores formed through the upper grommet, the end of the accessory, and the lower grommet so as to simultaneously secure the upper grommet to the lower grommet while retaining the end of the accessory within the slot in the upper grommet. Finally, the retaining structure of the lower grommet is addressed to a bore formed through the substrate of a vehicle and inserted therein, thereby securing the accessory to the substrate of the vehicle.

Note that in some circumstances, a cap will be assembled with the upper grommet prior to inserting the retaining structure of the lower grommet into the bore formed in the substrate of the vehicle. In addition, where rotation of the accessory is unwanted, an anti-rotation stem may be provided on a lower surface of the lower grommet and inserted into a bore formed in the substrate simultaneous with the insertion of the retaining structure of the lower grommet into a separate bore formed through the substrate.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DESCRIPTION OF THE DRAWINGS

FIG. 4 is a perspective view of an upper grommet of the accessory mounting mechanism;

FIG. 5 is a perspective view of an alternate embodiment of an upper grommet of the accessory mounting mechanism;

FIG. 6 is a perspective view of an accessory mounting mechanism of the present invention wherein the accessory is in a first, stowed position; and, FIG. 7 is a perspective view of an accessory mounting mechanism of the present invention wherein the accessory is in a second, extended position.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
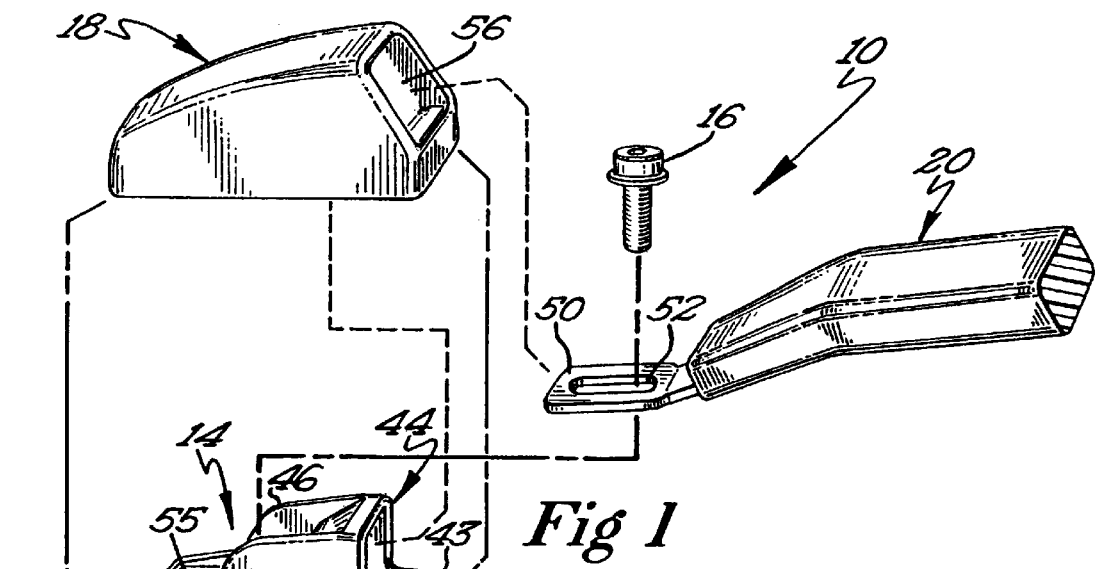
FIG. 1 is an exploded view of an accessory mounting mechanism of the present invention.

An accessory mounting mechanism 10 of the present invention may be seen in its component parts in FIG. 1. The accessory mounting mechanism 10 comprises a lower grommet 12, an upper grommet 14, a fastener 16, and a cap 18. The accessory mounting mechanism 10 is adapted to secure an accessory 20 to the substrate 22 of a vehicle. Note that, as used herein, the term "substrate" is used to denote the frame of an automobile, or any other structure to which an accessory 20 need be attached. Note also that the substrate 22 may comprise distinct layers, and in addition to a metallic frame, may also include a fiberboard and fabric headliner 24 of the type commonly used to finish the interior of vehicles.

Figure 2:
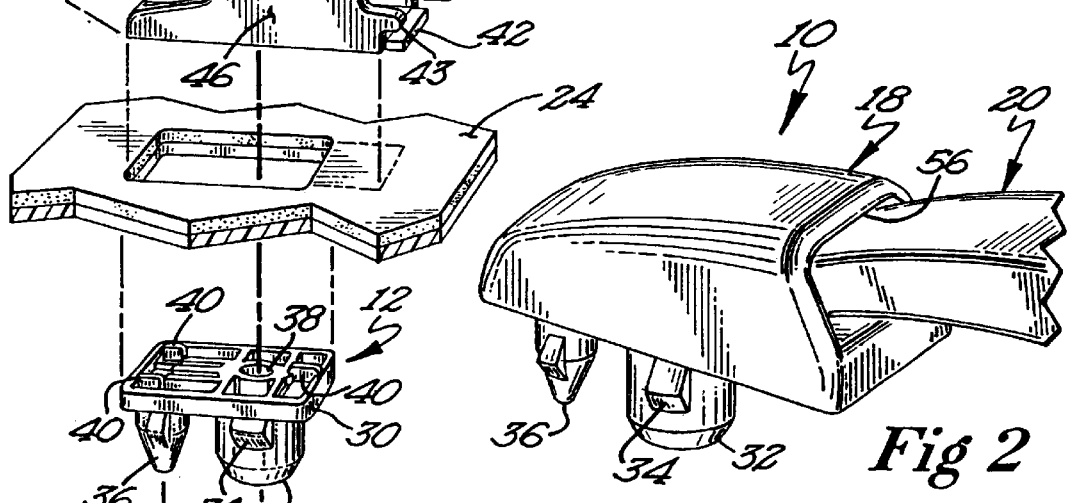
FIG. 2 is a perspective view of an assembled accessory mounting mechanism.

The accessory mounting mechanism 10 of the present invention is, in a preferred embodiment, used to mount an accessory 20 commonly referred to as an assist or grab handle to a vehicle. When the accessory mounting mechanism 10 of the present invention is fully assembled, as shown in FIG. 2, it may easily be secured to substrate 22 of a vehicle in a single step, without the need for special tools.

Figure 3:
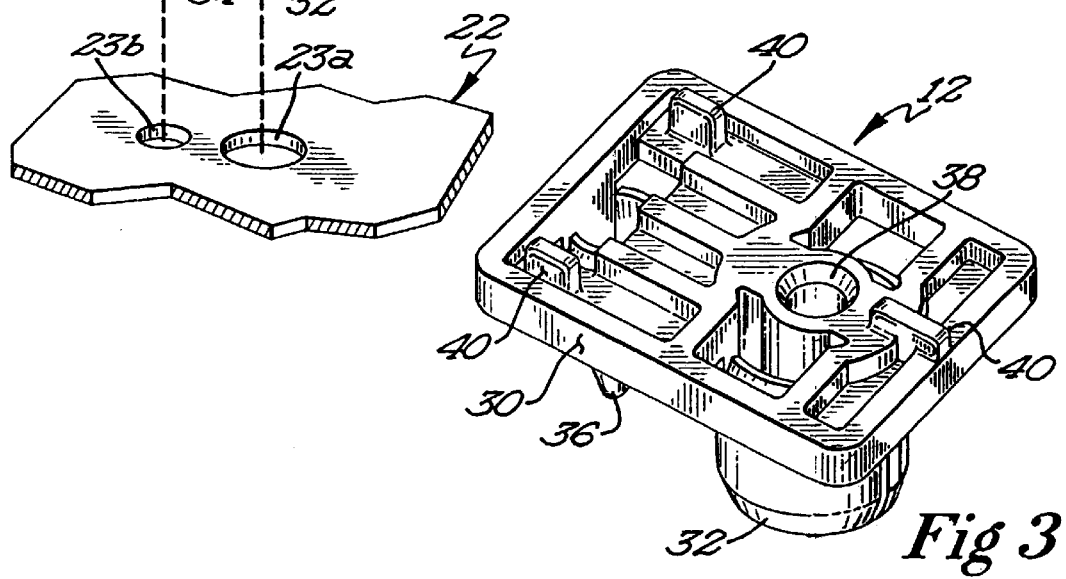
FIG. 3 is a perspective view of a lower grommet of the accessory mounting mechanism.

FIG. 3 illustrates a lower grommet 12 of the present invention. The lower grommet 12 is typically molded of a relatively rigid material such as nylon or acetal. The lower grommet has a generally rectangular body 30 from which depends a retaining structure 32. This retaining structure 32 may take many forms, but is preferably formed as a post or shaft that has a snap fit feature 34 (FIGS. 1 and 2) formed thereon. Preferably, the snap fit feature of the retaining structure 32 will comprise flexible tabs, detents, a plurality of flexible, frustoconical vanes, laterally extending wings, or a simple friction fit, where suitable. Where desirable, an additional stem 36 (see also FIGS. 1 and 2) may be formed adjacent the retaining structure 32 in order to prevent rotation of the lower grommet 12 when it is assembled with the substrate 22 of a vehicle. The anti-rotation stem 36 may be a simple, smooth shaft, or may include a snap fit type structure (not shown) that will assist in retaining the lower grommet 12 to the substrate 22.

The retaining structure 32 and the stem 36, if one is present, are adapted for insertion into bores 23A and 23B, respectively, formed through the relatively thin walled substrate 22 of a vehicle. Note that in some instances the retaining structure 32 and the stem 36 will be lengthened so as to extend through the headliner 24 and yet still engage bores 23A and 23B formed through the substrate 22.

The body 30 of the lower grommet 12 has a bore 38 formed therethrough that extends downwardly into the retaining structure 32. This bore is sized to receive the shaft of the fastener 16 therein. Note that the bore is sized so as to securely retain the shaft of the fastener 16 therein, i.e., the bore provides purchase for threads or includes snap fit type features in order to retain the fastener 16 therein.

The upper surface of the lower grommet 12 may have a plurality of registration tabs 40 (see, e.g., FIG. 3) extending upwardly therefrom. These tabs 40 may have any suitable shape or form, the only requirement being that the tabs 40 mate with complementary bores, cutouts, or channels formed in the undersurface of the upper grommet 14 so as to securely register the lower and upper grommets 12, 14. Note that the registration tabs 40 may be omitted if so desired.

A preferred embodiment of the upper grommet 14 is illustrated in FIG. 4. The upper grommet 14 comprises a base 42 and a superstructure 44 that is positioned above the base 42 upon side plates 46. A slot 48 that can best be seen in FIGS. 6 and 7 exists between the superstructure 44 and the base 42 of the upper grommet 14. This slot 48 is sized so as receive an end 50 (FIG. 1) of an accessory 20. Typically the end 50 of the accessory 20 will have a bore or hole 52 formed therethrough that provides for the connection of the accessory 20 to the accessory mounting mechanism 10. A bore 54 is formed entirely through the base 42 and superstructure 44 of the upper grommet 14 and intersects the slot 48 at a location that allows the hole 52 in the accessory end 50 to be aligned therewith. When the upper grommet 14 is registered with the lower grommet 12, the bore 54 of the upper grommet 14 will align with the bore 38 formed in the lower grommet 12. Once the upper grommet 14 is registered with the lower grommet 12, the accessory end 50 is inserted into the slot 48 of the upper grommet and the fastener 16 is inserted into bore 54 in the upper grommet, through hole 52 in the accessory end, and into bore 38 of the lower grommet 12 so as to secure the upper grommet 14 to the lower grommet 12 while simultaneously securing the accessory 20 to the upper grommet 14. Note that the fastener 16 is preferably a threaded fastener, but may have any suitable configuration, so long as the fastener 16 will suffice to secure the lower and upper grommets 12, 14 to one another while retaining the end 50 of the accessory 20 therein.

Assist or grab handle accessories 20 currently in use typically have two positions. The first position of the accessory 20 is referred to as a stowed position in which the accessory 20 lays flat against a headliner 24 of the vehicle. The accessory 20 is pulled away from the headliner 24 of the vehicle so that a passenger or driver of the vehicle may insert their hand between the accessory 20 and the headliner 24 in the accessory's 20 second position. In order to facilitate the positioning of the accessory 20 in these two positions, the upper grommet 14 is provided with a flexible tab 55. The hole 52 formed through the accessory end 50 is sufficiently elongate that the end 50 may slide through a slot 48 until such time as the forward portion of the hole 52 is engaged by the flexible tab 55. In this way, the accessory 20 will be maintained in its first, stowed, or retracted position as seen in FIG. 6. When a passenger or driver of a vehicle pulls on the accessory 20, the flexible tab 55 will be displaced, allowing the end 50 to slide out of the slot 48 until the forward portion of the hole 52 engages the shaft of the fastener 16. When in this position, as shown in FIG. 7, the accessory 20 will be in its second, extended position. Note that the flexible tab 55 is not a requisite part of the invention, and may be omitted if so desired.

An alternate embodiment of the upper grommet 14 having a somewhat slimmer profile is illustrated in FIG. 5. The embodiment of FIG. 5 is adapted to receive a larger cap 18 that likely covers then entire upper grommet 14, whereas the embodiment of the upper grommet 14 of FIG. 4 is better adapted to be at least partially exposed. Note that the embodiments of the upper grommet 14 illustrated in FIGS. 4 and 5 are functionally the same.

The cap 18 of the present invention serves to obscure and protect the lower and upper grommets 12, 14 once they have been secured to one another and the accessory end 50 is retained therein. The cap 18 is constructed and arranged to be secured to the upper grommet 14 in a snap fit arrangement. This snap fit arrangement may take any suitable form that will securely attach the cap 18 to the upper grommet 14. In a preferred embodiment, best seen in FIGS. 1 and 2, the cover 18 forms a dome-like structure having a single aperture 56 formed therein. The end 50 of the accessory 20 must be passed through this aperture 56 before the end 50 is inserted into the slot 48 in the upper grommet 14. Then, after the upper and lower grommets 14, 12 have been secured to one another so as to retain the end 50 of the accessory 20 therein, the cap 18 is slid down the accessory 20 to be engaged with the lower and upper grommets 12, 14. In the preferred embodiment of the present invention, the inner surface of the cap 18 is provided with a lip (not shown) that engages ears 43 (FIG. 4) of the upper grommet 14. The edge of the cap 18 opposite the lip is constructed and arranged to create an interference fit with the end of the upper grommet 14 opposite ears 43 to create a typical snap fit arrangement. Note that the lower grommet 12 may be constructed and arranged to provide the means for attaching the cap 18 to the accessory mounting mechanism 10 of the present invention in lieu of the upper grommet 14. It is to be understood that the cap 18 may have many different shapes, each shape adapted to best complement the interior of a vehicle into which it is installed. In addition, the aperture 56 may be formed as a slot so as to allow the cap 18 to be maintained separately from the upper and lower grommets 14, 12 until after the grommets have been secured to one another so as to retain the end 50 of the accessory therein. In addition, where the exterior of the sidewalls 46 of the upper grommet 14 have been adapted to be visible after final installation of the accessory mounting mechanism 10, the cap 18 may have an abbreviated shape adapted solely to cover that portion of the upper grommet wherein the bore 54 and flexible tab 54 are located.

In use, the accessory mounting mechanism 10 is typically assembled remotely from the vehicle with which it will ultimately be assembled. The assembled accessory mounting mechanism 10, as best seen in FIG. 2, is then brought to a vehicle and installed by inserting the retaining structure 32 into a bore 23A formed in the substrate 22 of the vehicle. Where present, the stem 36 will be inserted into bore 23B. As the retaining structure 32, and where present, the stem 36, are constructed and arranged to maintain a snap fit with the substrate 22, the accessory mounting mechanism 10 may be assembled simply by applying pressure to the cap 18 directly over the retaining mechanism 32 and stem 36. It is to be understood that, where necessary, multiple accessory mounting mechanisms 10 may be employed to secure an accessory 20 to the substrate 22 of a vehicle. For example, in the preferred embodiment of the present invention, the accessory mounting mechanism 10 is adapted to secure a single end of an assist or grab handle 20 to the substrate 22 of a vehicle. As this accessory 20 typically has two ends, two accessory mounting mechanisms 10 will be utilized to secure the accessory 20 to the substrate 22 of the vehicle. It will be appreciated that additional accessory mounting mechanisms, or indeed, fewer, may be utilized to secure various and sundry accessories 20 to the substrate 22.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A grommet assembly for securing an accessory to a substrate, the assembly comprising:

a lower grommet having an upper surface and a lower surface, the lower surface of the lower grommet having extending therefrom a retaining structure adapted to secure the lower grommet to the substrate by insertion into, and retention within a bore formed through the substrate, the retaining structure further having a bore formed therein, the bore having an entrance located on the upper surface of the lower grommet; and, an upper grommet having an upper surface and a lower surface, the lower surface of the upper grommet being adapted to mate with the upper surface of the lower grommet, the upper surface of the upper grommet having a superstructure formed thereto so as to form a slot for receiving an end of an accessory between the upper surface of the upper grommet and the superstructure, the upper grommet having a bore formed therethrough that intersects the slot such that a fastener passed through the bore will pass through the superstructure of the upper grommet, the end of the accessory received in the slot, and into the bore formed in the lower grommet, the fastener acting to simultaneously retain the end of the accessory in the slot of the upper grommet and to secure the upper grommet to the lower grommet.

2. The grommet assembly of claim 1 wherein the superstructure of the upper grommet is adapted to receive thereover a cap.

3. The grommet assembly of claim 1 wherein the upper and lower grommets comprise registration means for securely registering the upper grommet with the lower grommet such that the bores of the respective grommets are substantially aligned.

4. The grommet assembly of claim 1 wherein the lower grommet further comprises an anti-rotation stem extending downwardly from the lower surface thereof, the anti-rotation stem being constructed and arranged to be received within a bore formed in the substrate.

5. The grommet assembly of claim 1 wherein the upper retaining structure of the lower grommet comprises a snap fit mechanism that is chosen from a group consisting of flexible tabs, detents, a plurality of frustoconical vanes, and laterally extending wings.

6. The grommet assembly of claim 1 wherein the retaining structure of the lower grommet is constructed and arranged to be retained within the bore formed through the substrate by means of a friction fit between the outer surface of the retaining structure and the inner surface of the bore formed through the substrate.

7. The grommet assembly of claim 2 wherein the cap covers only a portion of the upper grommet.

8. The grommet assembly of claim 2 wherein the cap completely encloses the upper grommet.

9. The grommet assembly of claim 1 wherein the accessory retained within the slot formed in the upper grommet is chosen from a group consisting of a grab strap, a coat hook, and a hang hook.

10. The grommet assembly of claim 1 wherein the upper grommet further comprises a resilient tab that is constructed and arranged to engage the end of the accessory received within the slot of the upper grommet such that the end of the accessory will be retained in a first, stowed position when the resilient tab engages a hole formed through the end of the accessory, and in a second, extended position when the hole in the end of the accessory is out of engagement with the resilient tab.

* * * * *